(12) United States Patent
Castinado et al.

(10) Patent No.: US 10,929,545 B2
(45) Date of Patent: Feb. 23, 2021

(54) SYSTEM FOR PROVIDING ACCESS TO DATA STORED IN A DISTRIBUTED TRUST COMPUTING NETWORK

(71) Applicant: BANK OF AMERICA CORPORATION, Charlotte, NC (US)

(72) Inventors: Joseph Benjamin Castinado, North Glenn, CO (US); Samuel Massa Moiyallah, Jr., Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 187 days.

(21) Appl. No.: 16/050,149

(22) Filed: Jul. 31, 2018

(65) Prior Publication Data

US 2020/0042721 A1 Feb. 6, 2020

(51) Int. Cl.
*G06F 21/60* (2013.01)
*G06F 21/62* (2013.01)
(Continued)

(52) U.S. Cl.
CPC .......... *G06F 21/602* (2013.01); *G06F 16/116* (2019.01); *G06F 21/6218* (2013.01); *H04L 9/0637* (2013.01)

(58) Field of Classification Search
CPC .. G06F 21/602; G06F 16/116; G06F 21/6218; G06F 21/64; G06F 16/182;
(Continued)

(56) References Cited

U.S. PATENT DOCUMENTS 5,671,283 A 9/1997 Michener et al.
5,835,599 A 11/1998 Buer
(Continued)

FOREIGN PATENT DOCUMENTS

WO 2014162296 10/2014
WO 2015135018 9/2015

OTHER PUBLICATIONS

Buterin, Vitalik, "On Public and Private Blockchains", Aug. 7, 2015, https://blog.ethereum.org/2015/08/07/on-public-and--private- blockchains/.
(Continued)

*Primary Examiner* — Brandon S Hoffman
*Assistant Examiner* — Nega Woldemariam
(74) *Attorney, Agent, or Firm* — Michael A. Springs; Moore & Van Allen PLLC; James C. Edwards (57) ABSTRACT

Systems, computer program products, and methods are provided for storing data files within a distributed trust computing network, such as a blockchain network, which acts as a source of truth for the digital copy. In response to storing the data file within the distributed trust computing network, a machine-readable code is generated that when read by an authorized entity provides access to the certified digital copy stored within the distributed trust computing network. In this regard the machine-readable code serves as a pointer to the distributed trust computing network and the storage location within the trust network and, in specific embodiments the code is dynamic so as to provide access privileges (e.g., security credentials required to access, the content authorized to access, duration period for accessing and the like).

13 Claims, 6 Drawing Sheets

(51) Int. Cl.
*H04L 9/06* (2006.01)
*G06F 16/11* (2019.01)

(58) Field of Classification Search
CPC ....... H04L 9/0637; H04L 63/12; H04L 63/00; H04L 2209/38; H04L 2209/84; H04L 9/3239
USPC .......................................................... 726/28
See application file for complete search history.

(56) References Cited

U.S. PATENT DOCUMENTS

| | | | |
|---|---|---|---|
| 6,073,234 A | 6/2000 | Kigo et al. | |
| 6,324,286 B1 | 11/2001 | Lai et al. | |
| 6,330,655 B1 | 12/2001 | Vishlitzky et al. | |
| 6,725,303 B1 | 4/2004 | Hoguta et al. | |
| 6,850,252 B1 | 2/2005 | Hoffberg | |
| 6,973,187 B2 | 12/2005 | Gligor et al. | |
| 7,055,039 B2 | 5/2006 | Chavanne et al. | |
| 7,092,400 B2 | 8/2006 | Malzahn | |
| 7,184,549 B2 | 2/2007 | Sorimachi et al. | |
| 7,362,859 B1 | 4/2008 | Robertson et al. | |
| 7,392,384 B2 | 6/2008 | Hopkins et al. | |
| 7,428,306 B2 | 9/2008 | Celikkan et al. | |
| 7,502,933 B2 | 3/2009 | Jakobsson et al. | |
| 7,574,401 B1 | 8/2009 | Burns | |
| 7,649,992 B2 | 1/2010 | Raju et al. | |
| 7,764,788 B2 | 7/2010 | Tardo | |
| 7,979,889 B2 | 7/2011 | Gladstone et al. | |
| 8,078,874 B2 | 12/2011 | You et al. | |
| 8,107,621 B2 | 1/2012 | Celikkan et al. | |
| 8,155,311 B2 | 4/2012 | Shin et al. | |
| 8,259,934 B2 | 9/2012 | Karroumi et al. | |
| 8,358,781 B2 | 1/2013 | Schneider | |
| 8,379,841 B2 | 2/2013 | Taylor et al. | |
| 8,396,209 B2 | 3/2013 | Schneider | |
| 8,416,947 B2 | 4/2013 | Schneider | |
| 8,458,461 B2 | 6/2013 | Tardo | |
| 8,464,320 B2 | 6/2013 | Archer et al. | |
| 8,516,266 B2 | 8/2013 | Hoffberg et al. | |
| 8,590,055 B2 | 11/2013 | Yoon et al. | |
| 8,737,606 B2 | 5/2014 | Taylor et al. | |
| 8,942,374 B2 | 1/2015 | Fujisaki | |
| 8,983,063 B1 | 3/2015 | Taylor et al. | |
| 9,059,866 B2 | 6/2015 | Bar-Sade et al. | |
| 9,083,702 B2 | 7/2015 | Wied et al. | |
| 9,092,766 B2 | 7/2015 | Bedier et al. | |
| 9,298,806 B1 | 3/2016 | Vessenes et al. | |
| 9,635,000 B1 | 4/2017 | Muftic | |
| 9,672,499 B2 | 6/2017 | Yang et al. | |
| 2001/0020249 A1 | 9/2001 | Shim | |
| 2003/0126094 A1 | 7/2003 | Fisher et al. | |
| 2004/0172535 A1 | 9/2004 | Jakobsson et al. | |
| 2004/0199463 A1 | 10/2004 | Deggendorf | |
| 2005/0256802 A1 | 11/2005 | Ammermann et al. | |
| 2009/0094075 A1 | 4/2009 | Parisien et al. | |
| 2009/0125986 A1 | 5/2009 | Kiester et al. | |
| 2009/0281948 A1 | 11/2009 | Carlson | |
| 2010/0107225 A1 | 4/2010 | Spencer et al. | |
| 2010/0279653 A1 | 11/2010 | Poltorak | |
| 2011/0055913 A1 | 3/2011 | Wong | |
| 2011/0078073 A1 | 3/2011 | Annappindi | |
| 2011/0197064 A1 | 8/2011 | Garcia Morchon et al. | |
| 2012/0066121 A1 | 3/2012 | Shahbazi et al. | |
| 2012/0284175 A1 | 11/2012 | Wilson et al. | |
| 2013/0198061 A1 | 8/2013 | Dheer et al. | |
| 2013/0204783 A1 | 8/2013 | Klose et al. | |
| 2013/0232056 A1 | 9/2013 | Schulman | |
| 2013/0346294 A1 | 12/2013 | Faith et al. | |
| 2014/0006185 A1 | 1/2014 | Zurn et al. | |
| 2014/0089243 A1 | 3/2014 | Oppenheimer | |
| 2014/0114857 A1 | 4/2014 | Griggs et al. | |
| 2014/0295956 A1 | 10/2014 | Katz et al. | |
| 2014/0310171 A1 | 10/2014 | Grossman et al. | |
| 2015/0127527 A1 | 5/2015 | Eide | |
| 2015/0172053 A1 | 6/2015 | Schwarz et al. | |
| 2015/0206106 A1 | 7/2015 | Yago | |
| 2015/0262137 A1 | 9/2015 | Armstrong | |
| 2015/0332283 A1 | 11/2015 | Witchey | |
| 2015/0379510 A1 | 12/2015 | Smith | |
| 2015/0379636 A1 | 12/2015 | Szabo et al. | |
| 2016/0012424 A1 | 1/2016 | Simon et al. | |
| 2016/0028552 A1 | 1/2016 | Spanos et al. | |
| 2016/0050203 A1 | 2/2016 | Hefetz | |
| 2016/0092874 A1 | 3/2016 | O'Regan et al. | |
| 2016/0125376 A1 | 5/2016 | Beatty et al. | |
| 2016/0191243 A1 | 6/2016 | Manning | |
| 2016/0275461 A1 | 9/2016 | Sprague et al. | |
| 2016/0292672 A1 | 10/2016 | Fay et al. | |
| 2016/0321654 A1 | 11/2016 | Lesavich et al. | |
| 2016/0323109 A1 | 11/2016 | McCoy et al. | |
| 2016/0342978 A1 | 11/2016 | Davis et al. | |
| 2016/0342989 A1 | 11/2016 | Davis | |
| 2016/0342994 A1 | 11/2016 | Davis | |
| 2017/0005804 A1 | 1/2017 | Zinder | |
| 2017/0011460 A1 | 1/2017 | Molinari et al. | |
| 2017/0046526 A1 | 2/2017 | Chan et al. | |
| 2017/0046664 A1 | 2/2017 | Haldenby et al. | |
| 2017/0046680 A1 | 2/2017 | Crites | |
| 2017/0046806 A1 | 2/2017 | Haldenby et al. | |
| 2017/0048216 A1 | 2/2017 | Chow et al. | |
| 2017/0091397 A1 | 3/2017 | Shah | |
| 2017/0103167 A1 | 4/2017 | Shah | |
| 2017/0103461 A1 | 4/2017 | Acuna-Rohter et al. | |
| 2017/0109735 A1 | 4/2017 | Sheng et al. | |
| 2017/0116693 A1 | 4/2017 | Rae et al. | |
| 2017/0132625 A1 | 5/2017 | Kennedy | |
| 2017/0132626 A1 | 5/2017 | Kennedy | |
| 2017/0132630 A1 | 5/2017 | Castinado et al. | |
| 2017/0140375 A1 | 5/2017 | Kunstel | |
| 2017/0163733 A1 | 6/2017 | Grefen et al. | |
| 2017/0177855 A1 | 6/2017 | Costa Faidella et al. | |
| 2017/0178131 A1 | 6/2017 | Fernandez et al. | |
| 2017/0178237 A1 | 6/2017 | Wong | |
| 2017/0180134 A1 | 6/2017 | King | |
| 2017/0200137 A1 | 7/2017 | Vilmont | |
| 2017/0213209 A1 | 7/2017 | Dillenberger | |
| 2017/0214675 A1 | 7/2017 | Johnsrud et al. | |
| 2017/0214698 A1 | 7/2017 | Hughes et al. | |
| 2017/0220998 A1 | 8/2017 | Horn et al. | |
| 2017/0221052 A1 | 8/2017 | Sheng et al. | |
| 2017/0223005 A1 | 8/2017 | Birgisson et al. | |
| 2017/0228447 A1 | 8/2017 | Catania et al. | |
| 2017/0228822 A1 | 8/2017 | Creighton et al. | |
| 2017/0230375 A1 | 8/2017 | Kurian | |
| 2017/0230378 A1 | 8/2017 | Bliss | |
| 2017/0232300 A1 | 8/2017 | Tran et al. | |
| 2017/0235955 A1 | 8/2017 | Barkan | |
| 2017/0236407 A1 | 8/2017 | Rhoads et al. | |
| 2017/0243020 A1 | 8/2017 | Dhondse et al. | |
| 2017/0243287 A1 | 8/2017 | Johnsrud et al. | |
| 2018/0053161 A1 | 2/2018 | Bordash et al. | |
| 2018/0158036 A1* | 6/2018 | Zhou | H04L 9/0861 |
| 2018/0268479 A1 | 9/2018 | Dowling et al. | |
| 2020/0019616 A1* | 1/2020 | Sukhija | G06F 16/2365 |

OTHER PUBLICATIONS

PCT International Searching Authority; Written Opinion for PCT/IB16/01655 completed Mar. 11, 2017, 8 pages.

PCT International Searching Authority; International Search Report for PCT/IB16/01655 completed Mar. 12, 2017, 4 pages.

Tasca. "Digital Currencies: Principles, Trends, Opportunities, and Risks." Trends, Opportunities, and Risks. Sep. 7, 2015 (Sep. 7, 2015); Retrieved from https:www.researchgate.net/profile/Paola_Tasca/publication/290805276_Digital_Currencies_Principles_TrendsOpportunities_and_Risks/Links569bb9le)8ae6169e562552.pif, p. 1, 5, 10, 12, 14.

Lerner. "Mavepay, A New Lightweight Payment Scheme for Peer to Peer Currency Networks." Apr. 17, 2012 ((Apr. 17, 2012) Retrieved from <https://pdfs.semanticscholar.org/1185/a26f014678b959876519065e2624458d75b8.pdf> Entire document.

(56) References Cited

OTHER PUBLICATIONS

PCT International Searching Authority; International Search Report and Written Opinion for PCT/US2016/061402 dated Dec. 27, 2016.

Bradley Hope et al., "A Bitcoin Technology Gets Nasdaq Test"; May 10, 2015; retrieved from ittp://www.wsj.com/articles/a-bitcoin-technology-gets-nasdaq-test-1431296886.

Nathaniel Popper, "Bitcoin Technology Piques Interest On Wall Street"; Aug. 28, 2015 retrieved from http://www.nytimes.com/2015/08/31/business/dealbooldbitcoin-techno, Aug. 31, 2015.

Joseph C. Guagliardo et al., "Blockchain: Preparing for Disruption Like It's the '90s"; Mar. 14, 2016, retrieved from http://www.law360.com/articles/77120CVprint?section=ip.

Robert McMillian, "IBM Bets on Bitcoin Ledger"; Feb. 16, 2016, retrieved from https://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain technology_JANUARY_2015_RICHARD_LEE_TWESIGE/links/54a7836f0cf267bdb90a0ee6.pdf.

Malahov, Yanislav Georgiev, "BitAlias 1, Aka Usernames for Bitcoin, A New, Simple Naming System for Bitcoin Address", retrieved from https:/medium.com/bitalias-decentralized-naming-and-identity-service/bitalias-7b66bffed9d8 on Mar. 12, 2017; Bringing Crypto to the People, Founder of www.aeternity.com, Jun. 6, 2016, 6 pages.

\* cited by examiner

SYSTEM FOR PROVIDING ACCESS TO DATA STORED IN A DISTRIBUTED TRUST COMPUTING NETWORK

FIELD OF THE INVENTION

The present invention is generally directed to data storage in a distributed trust computing network and, more specifically, providing access to data stored in a distributed trust computing network, such as a blockchain network, through use of machine-readable code.

BACKGROUND

In many instances an individual or entity has a need to present original documents. For example, when a need arises to verify identity an individual may be required to provide their original birth certificate or some other document that verifies identity. In another example, when an individual purchases a new vehicle the individual may be required to provide the original title for their trade-in vehicle and present original signed loan documents to lending institutions.

However, the need to present original documents is typically problematic. All too often the individual or entity may be unaware as to where the original document(s) has been kept. This results in time exhausting search for the original document(s), which may be a futile effort if the document(s) cannot be located. In other instances, the original document may no longer exist (e.g., physically destroyed) or otherwise be unusable (e.g., damaged or tampered with).

Another problem may exist when the individual or entity has a need to expedite obtaining and/or transferring the original document(s). Even in those instances in which the individual or entity is aware of the location of the document(s), the location of the document(s) is typically different from the location where the presentation and/or transfer of the document(s) occurs (e.g., the document(s) is stored at the individual's residence and the document is needed to be presented at a place of business or the like).

Moreover, such documents typically contain highly data that is deemed to be non-public, confidential and/or private. As such, when presenting or transferring such document(s) the user/entity has a strong desire to insure that the only requisite data contained in the documents is presented to the requester and that only the requester is the party that is comes into contact with the document(s) (i.e., the data in the documents is presented on an as-needed basis and only to the parties authorized to view the documents).

Therefore, a need exists to be able to provide for a source of truth to original document(s). The source of truth should be capable of certifying that a digital copy of the document is an authentic, unaltered copy of the original document. In addition a need exists to readily and, in some instances, instantaneously access the source of truth to obtain the certified digital copy of the original document. In addition, the desired systems, methods and the like should insure that only authorized entities have the ability to access the source of truth to obtain the certified digital copy of the original document and that the authorized entities are only allowed to access/view requisite data within the certified digital copy of the original document.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like for storing data files within a distributed trust computing network, such as a blockchain network, which acts as source of truth for the digital copy. In response to storing the data file within the distributed trust computing network, the present invention generates a machine-readable code that, when read by an authorized entity, provides access to the certified digital copy stored within the distributed trust computing network. In this regard the machine-readable code serves as a pointer to the distributed trust computing network and the storage location within the trust network.

Moreover, in specific embodiments of the invention the user (i.e., owner or possessor of the data file) may define access privileges prior to storing the data file within the distributed trust computing network, such that the subsequently generated machine-readable code identifies the access privileges (e.g., entities authorized to access the certified digital copy stored within the distributed trust computing network, security credentials required to be presented to access the certified digital copy stored within the distributed trust computing network, content within the data file that authorized entities may access, duration/time period for accessing the certified digital copy stored within the distributed trust computing network and the like).

In this regard, the present invention provides an alternative to having to present or transfer an original data file/document. Specifically, the present invention provides for a certified copy of the original data file/document that has been verified through storage within a source of truth (i.e., the trust computing network/blockchain network). Moreover, since access to the certified copy of the original data file are provided through a machine-readable code, access may be obtained instantaneously once the entity desiring access is in possession of the machine-readable code. Moreover, since access privileges are assigned by the user and controlled via the machine-readable code only authorized entities are allowed to access the certified copy of the original file stored within the trust computing network and, in some instances, only authorized to access specific content within the certified copy of the original file and/or for a specified duration/period of time/number of accesses.

A system for providing access to data stored in a distributed trust computing network defines first embodiments of the invention. The system includes a distributed trust computing network (e.g., a blockchain network) comprising a plurality of decentralized nodes. Each decentralized node has a first memory and at least one first processor in communication with the memory. The first memory of the decentralized nodes is configured to store at least one distributed ledger comprising a plurality of blocks of data. The distributed trust computing network is configured to certify that the blocks of data are authentic and unaltered.

The system additionally includes a first computing platform disposed in a distributed computing network and including a second memory and at least one second processor in communication with the second memory. The second memory stores first instructions that are executable by the second processor and configured to (i) receive at least one input that requests storage of a data file within the distributed trust computing network, (ii) initiate storage of the data file as a block of a distributed ledger within the distributed trust computing network, (iii) in response to storing the data file within the block of the distributed ledger, determine network a storage location of the data file within the distributed trust computing network, and (iv) generate a machine-readable code (e.g., an optical code, such Quick-Response (QR) code, NexCode EZcode. Qode, SPARQcode or the like) that identifies (a) the distributed trust computing network, and (b) the storage location of the data file within the distributed trust computing network. The machine-readable code is configured to be captured and read to provide access to at least a portion of the data file stored within distributed trust computing network.

In specific embodiments of the system, the first instructions are further configured to embed the machine-readable code in the data file, wherein storage of the data file within the distributed computing network includes the embedded machine-readable code. For example, embedded a QR code or the like in the header or footer of a document file.

In further specific embodiments of the system, the first instructions are further configured to receive an input that identifies a type of distributed ledger (i.e., public ledger or private ledger) within the distributed trust computing network for storing the data file, wherein the type of distributed ledger includes a public distributed ledger and a private distributed ledger.

In other specific embodiments of the system, the first instructions are further configured to receive an input that identifies access privileges associated with the accessing the data file. In such embodiments of the system, the first instructions configured to generate the machine-readable code are further configured to generate the machine-readable code that identifies (c) the access privileges. The machine-readable code is configured to be captured and read to provide access to the data file based on the access privileges. In specific embodiments of the system, the access privileges identify (i) one or more entities authorized to access the data file, (ii) security credentials required to be provided by the one or more entities authorized to access the data file, and/or (iii) at least one content type associated with content within the data file that the one or more entities are authorized to access.

In further specific embodiments of the system, the first instructions are further configured to receive the input that identifies one or more entity categories authorized to access the data file. Each entity category is pre-configured to be associated with at least one of (i) content type associated with content within the data file that the entities within the entity category are authorized to access, and (ii) security credentials required to be provided by the entities within the entity category to access the data file.

In other specific embodiments of the system, the first instructions are further configured to initiate storage of the data file in at least one of (i) an original format and (ii) a converted non-editable format.

In still further embodiments the system includes a second computing platform disposed in the distributed computing network device. The second computing platform includes a third memory, at least one third processor in communication with the third memory and image-capturing device in communication with the at least one third processor. The third memory stores second instructions that are executable by the second processor and configured to (i) implement the image-capturing device to capture the machine-readable code, (ii) read the machine-readable code, and (iii) in response to reading the machine-readable code, provide access to at least a portion of the data file stored within the distributed trust computing network. In specific embodiments of the system, the second instructions are further configured to, in response to reading the machine-readable code, request and receive an input that includes security credentials that authorize an entity to access the at least a portion of the data file, verify the security credentials, and in response to verifying the security credentials, provide access to at least a portion of the data file stored within the distributed trust computing network. In other related embodiments of the system the second instructions are further configured to, in response to reading the machine-readable code, request and receive an input that defines a file destination address (e.g., email address or the like) for the at least a portion of the data file, and provide access to at least a portion of the data file stored within the distributed trust computing network by communicating the at least a portion of the data file to the file destination address.

A computer-implemented method for providing access to data stored on a distributed trust computing network defines second embodiments of the invention. The computer-implemented method is implemented by one or more processing devices> The method includes (i) receiving at least one input that requests storage of a data file within the distributed trust computing network, (ii) initiating storage of the data file as a block of a distributed ledger within the distributed trust computing network, (iii) in response to storing the data file within the block of the distributed ledger, determining a storage location of the data file within the distributed trust computing network, and (iv) generate a machine-readable code that identifies (a) the distributed trust computing network, and (b) the storage location of the data file within the distributed trust computing network. The machine-readable code is configured to be captured and read to provide access to at least a portion of the data file stored within distributed trust computing network.

In specific embodiments the method further includes embedding the machine-readable code in the data file; and storing, within computing device memory, the data file including the embedded machine-readable code.

In other specific embodiments of the method, receiving the at least one input further includes receiving an input that identifies a type of distributed ledger (e.g., a public distributed ledger and a private distributed ledger) within the distributed trust computing network for storing the data file, wherein the type of distributed ledger includes.

In still further specific embodiments of the method, receiving the at least one input further comprises receiving an input that identifies access privileges associated with the accessing the data file. In such embodiments of the method, generating the machine-readable code further comprises generating the machine-readable code that identifies (c) the access privileges. The machine-readable code is configured to be captured and read to provide access to the data file based on the access privileges.

In still further specific embodiments of the method, receiving the input that identifies access privileges further defines the access privileges at least one of (i) one or more entities authorized to access the data file, (ii) at least one content type associated with content within the data file that the one or more entities are authorized to access, and (iii) security credentials required to be provided by the one or more entities authorized to access the data file.

A computer program product including a non-transitory computer-readable medium defines third embodiments of the invention. The computer-readable medium includes a first set of codes for causing a computer to receive at least one input that requests storage of a data file within a distributed trust computing network and a second set of codes for causing a computer to initiate storage of the data file as a block of a distributed ledger within the distributed trust computing network. The computer-readable medium additionally includes a third set of codes for causing a computer to, in response to storing the data file within the block of the distributed ledger, determine a storage location of the data file within the distributed trust computing network, and a fourth set of codes for causing a computer to generate a machine-readable code that identifies (i) the distributed trust computing network, and (ii) the storage location of the data file within the distributed trust computing network. The machine-readable code is configured to be captured and read to provide access to at least a portion of the data file stored within distributed trust computing network.

Thus, according to embodiments of the invention, which will be discussed in greater detail below, the present invention provides for storing data files within a distributed trust computing network, such as a blockchain network, which acts as a source of truth for the digital copy. In response to storing the data file within the distributed trust computing network, a machine-readable code is generated that, when read by an authorized entity, provides access to the certified digital copy stored within the distributed trust computing network. In this regard the machine-readable code serves as a pointer to the distributed trust computing network and the storage location within the trust network and, in specific embodiments the code is dynamic so as to provide access privileges (i.e., who is authorized to access, the content authorized to access, duration period for accessing and security credentials required to access).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed for storing data files within a distributed trust computing network, such as a blockchain network, which acts as source of truth for the digital copy. In response to storing the data file within the distributed trust computing network, the present invention generates a machine-readable code that, when read by an authorized entity, provides access to the certified digital copy stored within the distributed trust computing network. In this regard the machine-readable code serves as a pointer to the distributed trust computing network and the storage location within the trust network.

Moreover, in specific embodiments of the invention the user (i.e., owner or possessor of the data file) may define access privileges prior to storing the data file within the distributed trust computing network, such that the subsequently generated machine-readable code identifies the access privileges (e.g., entities authorized to access the certified digital copy stored within the distributed trust computing network, security credentials required to be presented to access the certified digital copy stored within the distributed trust computing network, content within the data file that authorized entities may access, duration/time period for accessing the certified digital copy stored within the distributed trust computing network and the like).

Thus, the present invention provides an alternative to having to present or transfer an original data file/document. Specifically, the present invention provides for a certified copy of the original data file/document that has been verified through storage within a source of truth (i.e., the trust computing network/blockchain network). Moreover, since access to the certified copy of the original data file are provided through a machine-readable code, access may be obtained instantaneously once the entity desiring access is in possession of the machine-readable code. Moreover, since access privileges are assigned by the user and controlled via the machine-readable code only authorized entities are allowed to access the certified copy of the original file stored within the trust computing network and, in some instances, only authorized to access specific content within the certified copy of the original file and/or for a specified duration/period of time/number of accesses.

Figure 1:
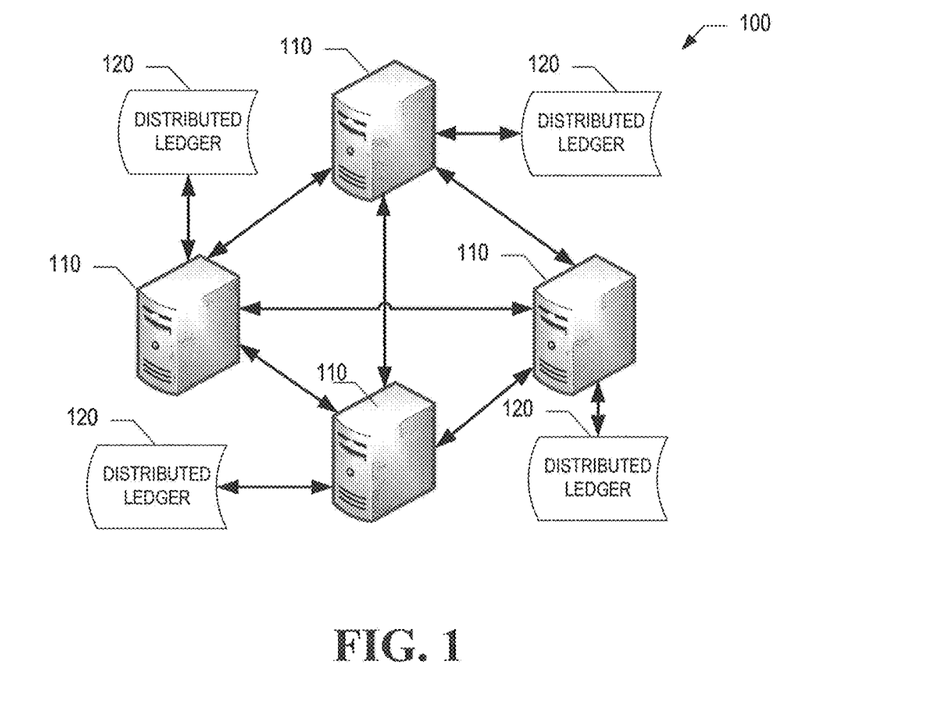
FIG. 1 is a schematic diagram of a distributed trust computing network, such as a blockchain network, in accordance with some embodiments of the present disclosure.

Turning now to the figures, FIG. 1 a schematic diagram is provided of an exemplary distributed trust computing network 100 otherwise referred to herein as a blockchain network or "block chain", in accordance with embodiments of the present invention. The distributed trust computing network is a distributed database that maintains, e.g., a list of data records, or the like. In specific embodiments of the invention the data records may include data files (documents, audio files, multimedia files or the like), which a user (data file holder/possessor) desires to store within the trust network as a certified/verified copy of the original data file. The security of the data maintained within the trust network is enhanced by the distributed nature of the network/block chain. The trust network typically includes several nodes 110, which may be one or more systems, machines, computers, databases, data stores or the like operably connected with one another. In some instances, each of the nodes 100 or multiple nodes 100 are maintained by different entities. A trust network typically works without a central repository or single administrator. One well-known application of a trust network/block chain is the public ledger of transactions for cryptocurrencies such as used in bitcoin. The data records recorded in the trust network/block chain are enforced cryptographically and stored on the nodes 100 of the block chain.

A distributed trust network provides numerous advantages over traditional storage networks/databases. A large number of nodes 110 of a trust network may reach a consensus regarding the validity of resources maintained with a block of the blockchain, in the context of the present invention a data file maintained on a ledger 120. Additionally, when multiple versions of a data file exits on the ledger 120, multiple nodes 110 can converge on the most up-to-date version of the data file. For example, in the case of a data file, any node 110 within the trust network 100 that stores a record, such as data file can determine within a level of certainty whether record can be authenticated/authorized to take place and become final by confirming that no conflicting records are confirmed by the trust network/block chain elsewhere.

The blockchain chain typically has two primary types of records. The first type is the record type, which consists of the actual data stored in the block chain. The second type is the block type, which are records that confirm when and in what sequence certain events became recorded as part of the blockchain. Records, such as a data file and the events associated therewith are created by participants using the blockchain in its normal course of business, for example, when a data file is received, a block(s) is created by users known as "miners" who use specialized software/equipment to create blocks. Holders (also, referred to as users) of a block of the blockchain agree to store a data file within the trust network 100 and the related data file records are passed around to various nodes of the block chain. A "valid" data file or related event is one that can be validated based on a set of rules that are defined by the particular system implementing the trust network/block chain. For example, in the case of data files, a valid data file is one that authenticates the user and authorizes entities to access the distributed ledger 120 holding the data file.

A trust network/block chain 100 is typically decentralized—meaning that a distributed ledger 120 (i.e., a decentralized ledger) is maintained on multiple nodes 110 of the trust network/block chain 100. One node in the trust network/block chain may have a complete or partial copy of the entire ledger 120 or set of records and/or blocks on the trust network/block chain. Events are initiated at a node 110 of a trust network/block chain 100 and communicated to the various nodes 110 of the trust network/blockchain 100. Any of the nodes 110 can validate a data file/record or an associated event, add the data file/record or the details of the storage event to its copy of the trust network/blockchain 100, and/or broadcast the record or details of the storage event, its associated validation (in the form of a block) and/or other data to other nodes 110. The block chain 100 shown in FIG. 1 is configured to perform one or more of the steps or functions performed by the system shown in FIG. 2, the computing platform shown in FIG. 3 and the methods described by FIGS. 4-6.

Figure 2:
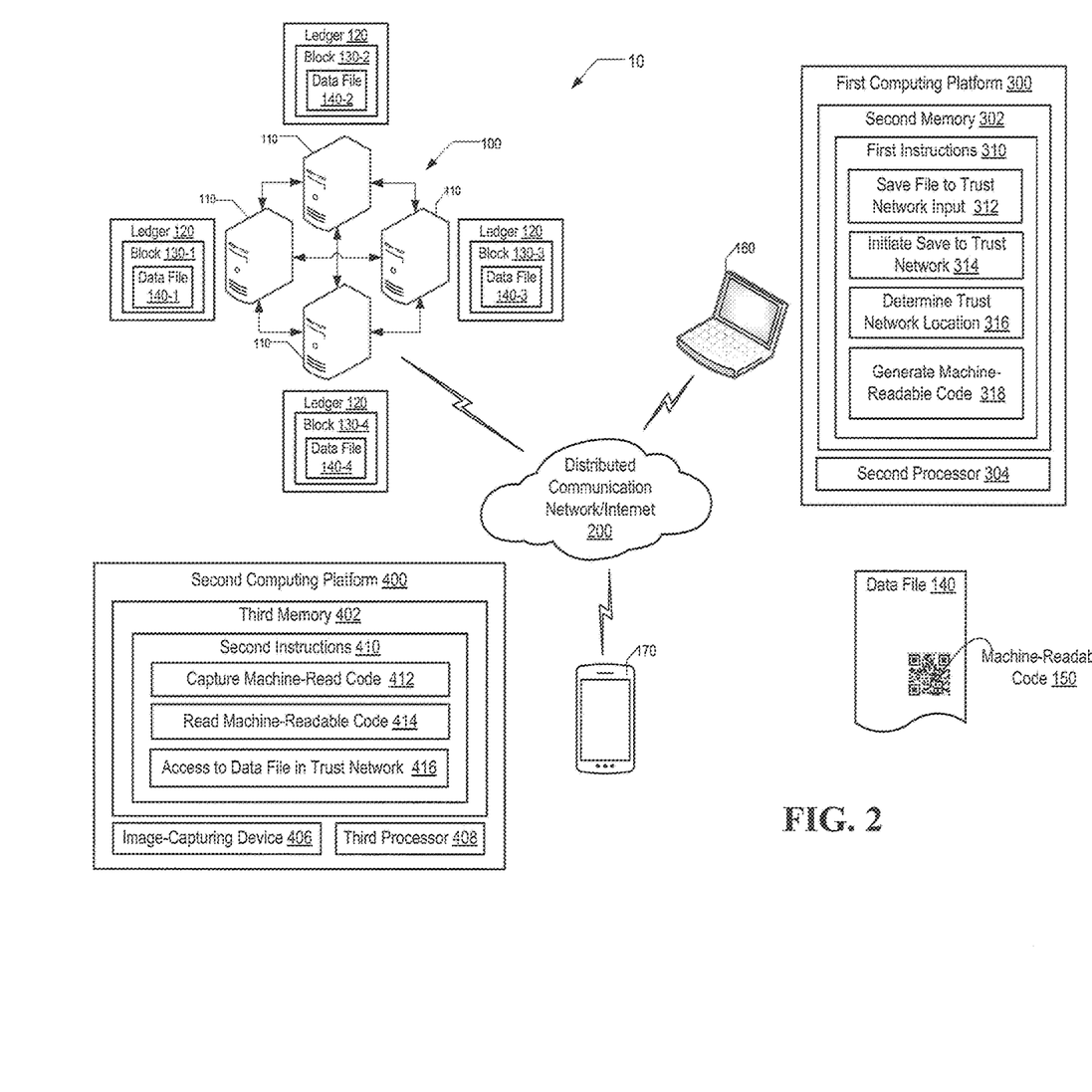
FIG. 2 is a schematic diagram of a system for storing and providing a means for accessing to data files within a distributed trust computing network, in accordance with some embodiments of the present disclosure.

Referring to FIG. 2, a block diagram is presented of a system 10 for storing data files on a distributed computing network and providing access to the data files via a machine-readable code, in accordance with embodiments of the present invention. The system 10 includes a distributed trust computing network 100 as described in relation to FIG. 1. The distributed trust computing network 100 includes a plurality of decentralized nodes 110. Each decentralized node having a first memory (not shown in FIG. 2) and at least one first processor (not shown in FIG. 2) in communication with the first memory. The first memory of the decentralized nodes is configured to store at least a portion of a distributed ledger 120 that includes a plurality of blocks 130. The processors of distributed trust computing network are configured to certify/validate that the blocks 130 of data are authentic and unaltered.

The system additionally includes a first computing platform 300 disposed within a distributed communication network 200, such as the Internet and/or intranets. The first computing platform may comprise one or more computing devices, for example portable computing device 160. The computing platform 300 includes a second memory 302 and at least one second processor 304 in communication with the memory. The second memory includes first instructions 310 that are executable by first processor 304. The instructions 310 include an instruction 312 for receiving an input that requests storage of a data file 140 within the distributed computing network 100 and an instruction 314 for, in response to receiving the input, initiating storage of the data file 140 as a block 130 of a distributed ledger 120 within the distributed trust computing network 100. Storage of the data file 140 within the distributed trust computing network 100 provides for a certified/verified copy of the original data file to exist on the trust network/block chain 100.

The instructions 310 further include an instruction 316 for determining the storage location (e.g., node 110, distributed ledger 120 and/or block 130) of the data file within the distributed trust computing network. Further, the instructions 310 include an instruction 318 to generate a machine-readable code 150 (e.g., an optical code, such as Quick Response (QR) code, NexCode, Ezcode, Aztec code, SPAR-Qcode, Qode or the like) that identifies, at a minimum, (i) the distributed trust computing network 100, and (ii) the storage location (e.g., node 110, distributed ledger 120 and/or block 130) of the data file 140 within the distributed trust computing network 100. The machine-readable code is configured to be captured and read so as to provide access to at least a portion of the data file 140 stored with the distributed trust computing network. In additionally embodiments of the system, as described in more detail in relation to FIG. 3, the machine-readable code 150 will be a dynamic machine-readable code 150 generated in conjunction with an integrated Application Programming Interface (API). A dynamic machine-readable code 150 provides for code 150 to additionally be configured to provide access privileges (e.g., entities authorized to access the data file, security credentials required to access the data file, specific content within the data file that an entity is authorized to access, duration of an access period or number of access events allowed and the like).

While first computing platform 300 is shown as a computing device 160 disposed in the distributed communication network 200, some of first computing platform 300 instructions 310 may be performed, at least in part, by processing capabilities within the distributed trust computing network 100.

In specific embodiments of the invention the machine-readable code 150 is subsequently embedded with the original digital data file 140 (e.g., in the header or footer of a document file) and stored within the memory 302 of computing platform 300 or other memory accessible via the distributed communication network 200. Embedding the machine-readable code 150 within the original digital data file 140 allows for a document file to subsequently be printed and for the entity in possession of the printed document to scan/capture the machine-readable code 150 to access the certified/verified copy of the data file 140 stored on the distributed trust computing network 100.

In specific embodiments the system includes a second computing platform 400 disposed in the distributed communications network 200. The second computing platform may comprise one or more computing devices, for example wireless computing device 170 (e.g., smart phone or the like). The computing platform 400 includes a third memory 402 and at least one third processor 404 in communication with the third memory 402. The computing platform 400 additionally includes image-capturing device 406 that is in operable communication with third processor 404 and is configured to capture images. The third memory 402 includes second instructions 410 that are executable by third processor 404. The second instructions 410 an instruction 412 for receiving an input to capture the machine-readable code 1. As previously discussed the machine-readable code 150 may be embedded in the original data file 140 or, in other instances, the machine-readable code 150 may be printed or otherwise affixed to any other document or item. Second instructions 414 additionally include instructions 414 for reading the optical machine-reading code to identify the distributed trust computing network 100 and the storage location (e.g., node 110, distributed ledger 120 and/or block 130) of the data file within the distributed trust computing network. Additionally, second instructions 410 include instructions 416 for providing access to at least a portion of the data file 140 stored within the distributed trust computing network 100. In specific embodiments of the invention the entity requesting access to the verified/certified copy of the data file 140 may provide an email address or the like, which, once the verified/certified copy of the data file 140 has been retrieved, is communicated to the entity's designated email address.

Figure 3:
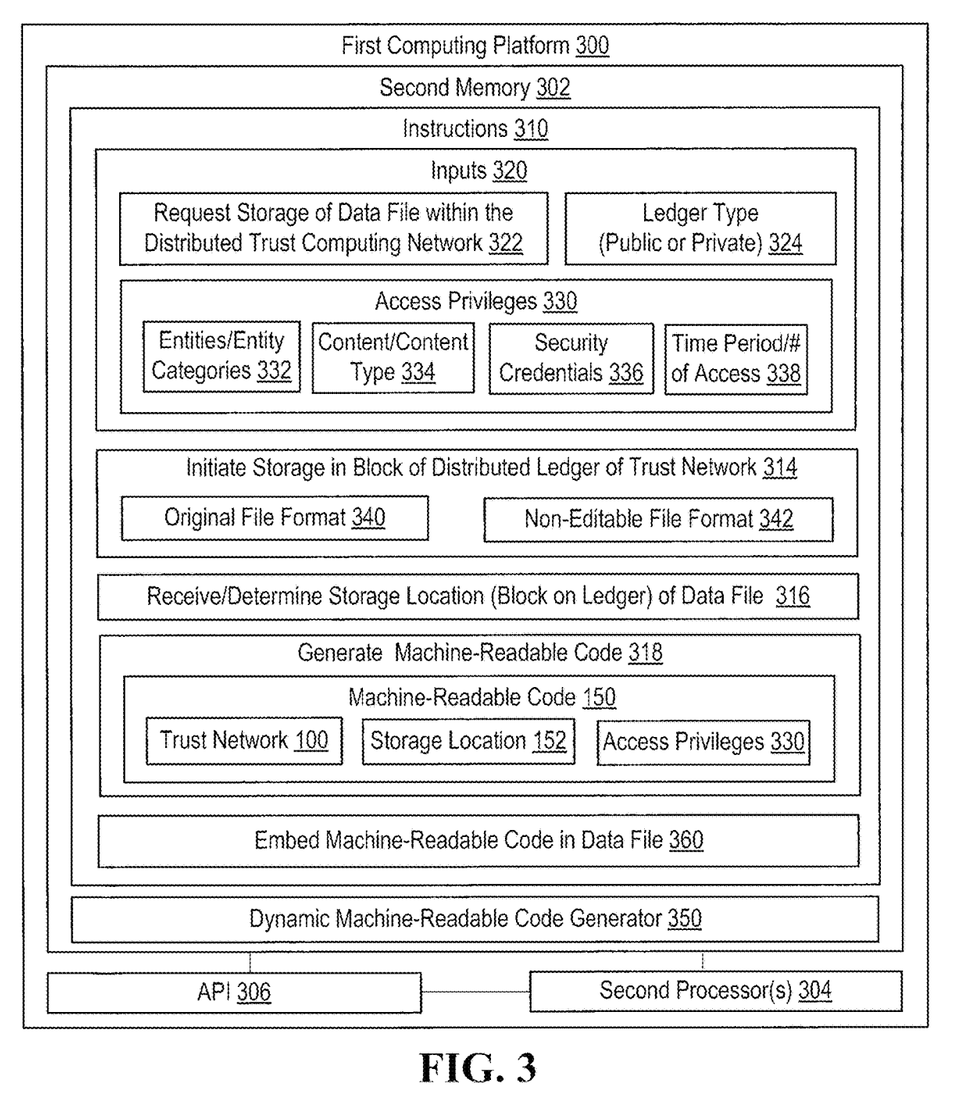
FIG. 3 is a block diagram of a computing platform configured for storing and providing a means for accessing to data files within a distributed trust computing network, in accordance with some embodiments of the present disclosure.

Referring to FIG. 3 a block diagram is depicted of the first computing platform 300 configured for storing data files on a distributed computing network and providing access to the data files via a machine-readable code, in accordance with embodiments of the present invention. First computing platform 300, which comprise one or more computing devices (e.g., portable computing devices, personal computers, servers or the like), is configured to execute instructions, such as algorithms, modules, routines, applications and the like. First computing platform 300 includes second memory 302, which may comprise volatile and non-volatile memory, such as read-only and/or random-access memory (RAM and ROM), EPROM, EEPROM, flash cards, or any memory common to computing platforms). Moreover, second memory 302 may comprise cloud storage, such as provided by a cloud storage service and/or a cloud connection service.

Further, first computing platform 300 also includes at least one second processor 304, which may be an application-specific integrated circuit ("ASIC"), or other chipset, logic circuit, or other data processing device. Second processor 304 may execute one or more application programming interface (APIs) 306 that interfaces with any resident programs, such as machine-readable code generator 350 (e.g., dynamic QR code generator or the like) or, stored in the second memory 402 of the first computing platform 300 and any external programs. Processor 304 may include various processing subsystems (not shown in FIG. 3) embodied in hardware, firmware, software, and combinations thereof, that enable the functionality of first computing platform 300 and the operability of the first computing platform 300 on the distributed computing network 200. For example, processing subsystems allow for initiating and maintaining communications and exchanging data with other networked devices. For the disclosed aspects, processing subsystems of second processor 302 may include any subsystem used in conjunction with instructions 310, the machine-readable code generator 350 and related tools, routines, sub-routines, algorithms, sub-algorithms, sub-modules thereof.

First computing platform 300 may additionally include a communications module (not shown in FIG. 3) embodied in hardware, firmware, software, and combinations thereof, that enables electronic communications between the computing platform 300 and other network devices, such as those shown in FIG. 1. Thus, communication module may include the requisite hardware, firmware, software and/or combinations thereof for establishing and maintaining a network communication connection.

Second memory 302 of first computing platform 300 stores instructions 310 configured to store a data file in a distributed trusted computing network and provide access to the verified/certified copy of the data file stored in the trust network via a machine-readable code, in accordance with embodiments of the present invention. In specific embodiments of the invention the instructions 310 may be part of a trust network-related application, such as a blockchain wallet or the like.

The instructions 310 an instructions to receive one or more inputs 320 associated with storing the data file 140 in the trusted computing network 100 and generating the machine-readable code 150. The input-related instructions 320 include an instruction 322 for receiving an input to request storage of the data file within the distributed trust network. In further specific embodiments of the invention, the input-related instructions 320 may include an instruction 324 to receive a ledger type input (i.e., an option for the user to choose between one or more public ledgers or one or more private ledgers). Public ledgers are generally accessible to all individuals, while private ledgers are generally accessible to specific individual/entities that have been granted access privileges. However, in accordance with specific embodiments of the present invention, the machine-readable code may be configured with access privileges even though the data file is stored on a public ledger.

Input-related instructions 320 may additionally instructions 330 to receive one or more inputs that assign access privileges to the storage of the data file. The instructions may 330 may include an instruction 332 to receive an input that defines the entity(s) or entity category(s)/classification(s) authorized to access the data file. In specific embodiments of the invention, the entity(s) or entity categories may be based on whether the type of data file and/or whether the data file is stored on a public ledger or a private ledger. For example, the instructions may be configured such that certain entities may be authorized to access data stored on both public and private ledgers (i.e., so-called super users/entities), while other entities may be authorized to access data stored only on the public ledgers (i.e., so-called regular users/entities). Defining the entity(s) or entity category(s) authorized to access the data file may trigger communication of a passcode to the entity or entities within a category/classification that is required to be inputted once the machine-readable code has been read in order to grant access to the certified/validated copy of the data file stored in the trust network. In other embodiments of the invention, the entity(s) and/or entity categories(s) may be preconfigured by the user based on data file type and/or contents in the data file (e.g., certain entities or entity categories may be preconfigured to access only certain types of data files or certain types of content within a data file).

In other specific embodiments of the invention, the input-related instructions 320 may include an instruction 336 that defines the security credentials required to be inputted by those entities that will be accessing the certified/validated copy of the data file stored in the trust network. The user may define the security credentials (e.g., password, biometrics, or the like) at the time of the request or the security credentials may be preconfigured by the user or predefined by the instructions and stored in the associated application (e.g., stored in a secure memory of a blockchain wallet). In other instances, the security credentials required to access the data file will be associated with the entity(s) or entity category(s) authorized to access the certified/validated copy of the data file and/or the content and/or content categories authorized to be accessed. The security credentials assigned may be based on the content or category of content that an entity is authorized to access. For example, a higher level of security credentials may be required to access private or confidential content, while a lower level of security credentials may be required to access public content.

Further, the instructions may 330 may include an instruction 334 to receive an input that defines the content and/or content type (s) that is authorized to be accessed from the certified/verified copy of the data file. For example, the user may specify individual data elements within the data file that are authorized to be accessed and/or the user may specify content categories (e.g., public data, non-public data, confidential data, private data or the like) that are authorized to be accessed. The user may preconfigure which data falls within which data category. Moreover, the content and/or content type that is authorized to be accessed may be associated with the entities or entity categories authorized to access the data (e.g., certain entities or entity categories may be preconfigured to access certain content or content types or inputs may be received at the time of the storage request that define which entity(s) or entity category(s) can access which content or which content categories. In this regard, the present invention provides access granularity, in that, not only may access be granted to an entire data file but, also, access may be granted to specified portions of the data file (i.e., specific content or a specific clip or the like) as designated by the user.

Additionally, the instructions 330 may include an instruction 338 that defines the time period for accessing the certified/verified copy of the data file and/or the number/quantity of accesses permitted. In this regard, the user may regulate the amount of access that is authorized on a per entity/entity category basis and/or a per content/content category basis. In other words, certain entities or entity categories may have access for longer periods of time than other entities or entity categories and/or certain content or content categories may be accessible for longer periods of time than other content or content categories.

Instructions 310 additionally include instructions 314 configured, in response to receiving the storage request, initiate storage of the data file as a block of a distributed ledger within the distributed trust computing network. The instructions may be configured or the user may configure, via input prior to or conjunction with the storage request, to store the data file in the original data file format 340 (e.g., word processing, spreadsheet format or the like) and/or store the data file in a non-editable file format 342 (e.g., image format or the like).

Further, instructions 310 include instructions 316 configured to, in response to storing the certified/verified copy of the data file in the trust network, determine and/or receive the storage location of the certified/verified copy of the data file within the distributed trust computing network. The storage location may be defined by an address connoting a block within a specified ledger of the trust computing network or the like.

Moreover, instructions 310 include instructions 318 that execute machine-readable code generator 350 to generate machine-readable code 150. The optical machine readable code 150 is configured to identify (i) the distributed trust computing network 100, and (ii) the storage location 152 of the certified/verified copy of the data file within the trust network, so as to act as a pointer for accessing at least a portion of the certified/verified copy of the data file. In specific embodiments of the invention, in which the machine-readable code generator 350 is a dynamic generator the machine-readable code 150 may be further configured to identify and invoke the access privileges 330. For example, the machine-readable code 150 may provide for an entity to enter requisite security credentials (e.g., username, passcode, biometrics or the like) in order to access at least a portion of the certified/verified copy of the data file. In other embodiments of the invention, the machine-readable code 150 may be configured to identify the content and/or content categories that an accessor is authorized to access, such configuration may be based on the entity or entity category that is requesting access (as identified by previously inputted username and/or passcode or the like). In still further embodiments of the invention, the machine-readable code 150 may be configured to identify the time period for accessing the certified/verified copy of the data file and/or the name/quantity of accesses permitted and to grant or deny access in accordance with the time period and/or the name/quantity of accesses permitted.

In optional embodiments of the invention, the instructions 350 may further include an instruction 350 configured to embed the generated machine-readable code 150 in the original data file stored in the second memory 302 or some other memory accessible via the distributed communication network 200. In specific embodiments the machine-readable code 150 is embedded in discreet area of the document/data file, such as, but not limited to, the header or footer of the document or the like. Embedding the machine-readable code 150 in the data file, provides for certified/verified copy of the data file to be accessed when the original data file is printed and the code is scanned and read.

Figure 4:
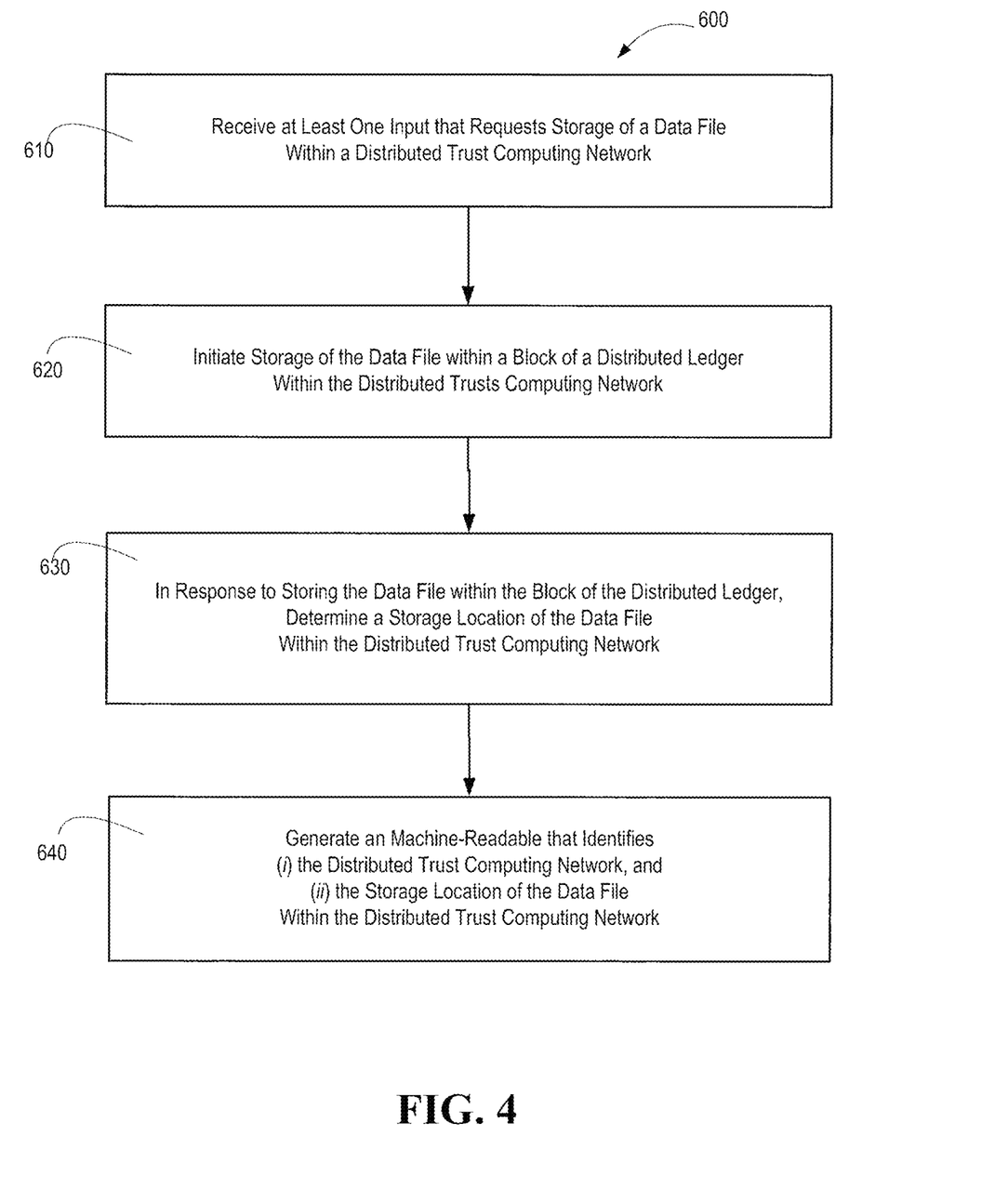
FIG. 4 is a flow diagram of a method for storing and providing a means for accessing to data files within a distributed trust computing network, in accordance with some embodiments of the present disclosure.

Referring to FIG. 4 a flow diagram is presented of a method 600 for providing access to data file stored in a distributed trust network via a machine-readable code, in accordance with embodiments of the present invention. At Event 610, at least one input is received that requests storage of a data file (e.g., document file, audio file, multimedia file or the like) within a distributed trust computing g network (e.g., blockchain network or the like). The input may be received through a trust network wallet or the like stored on a mobile/portable computing device. In optional embodiments of the method, further inputs arte received, such as, but not limited to, an input that defines a type of ledger (e.g., public or private) within the trust network, an input that defines access privileges (e.g., security credentials required to access, an input that defines the content and/or content categories that an entity is authorized to access and the like. In specific embodiment of the invention, an input may designate a portion of the data file to be filed on the public ledger and another portion of the data file to be filed on a private ledger.

At Event 620, in response to receiving the input to request the storage, storage of the data file within a block of a distributed ledger within the trust network is initiated. At Event 630, in response to storing the data file as a block(s) of the distributed ledger(s) within the distributed trust computing network, the storage location (e.g., node, block, ledger or the like) of the data file within the trust network is determined/received.

At Event 640, a machine-readable code (e.g., QR code or the like) is generated that identifies (acts as a pointer to) (i) the distributed trust computing network, (ii) the storage location of the data file within the distributed trust computing network, and, in some embodiments, (iii) the access privileges. The machine-readable code is configured to be captured and ready to provide access to at least a portion of the date file within the distributed computing network.

In specific embodiments the method further includes embedding the machine-readable code in the original data file (such as in the header or footer of a document file) and storing the data file with the embedded machine-readable code in local memory or distributed computing network (e.g., network or cloud) memory. Such that when the document file is printed, an entity in possession and authorized may scan the machine-readable code to access the certified/verified copy of the data file stored within the distributed trust computing network.

Figure 5:
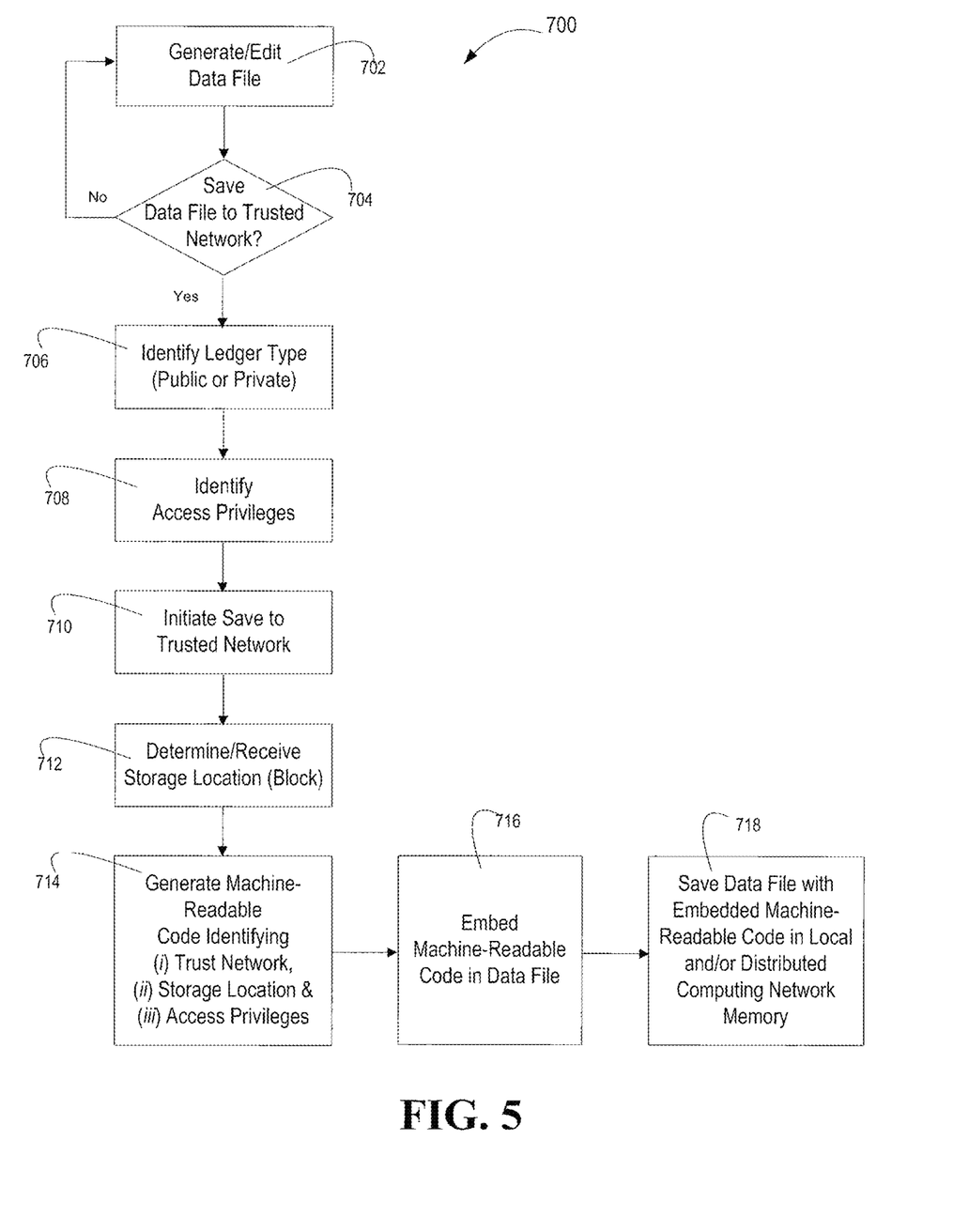
FIG. 5 is a flow diagram of a method for storing data files within a distributed trust computing network and generating a machine-readable code that provides access to the data file stored in the trust computing network, in accordance with embodiments of the present invention.

Referring to FIG. 5 a flow diagram is depicted of a method 700 for storing a data file within a distributed trust computing network and, in response, generating an optical machine readable code, in accordance with embodiment of the present invention. At Event 702, a data file (e.g., document file, audio file, image file, multimedia file or the like) is being generated, edited, accessed or the like and, at Decision 704, a determination is made as to whether a user has requested that the data file be stored in a distributed trust computing network. If not request has been made, the process returns to Event 704. If a request to store the data file in the distributed trust computing network has been made, at optional Event 706, a request may be made and input received that defines a ledger type (e.g., public ledger or private ledger). In specific embodiments the input may include storing different portions/content of the data file on both the public ledger and the private ledger, such that, certain portions/content of the data file may different access privileges than other portion/content of the data file.

At optional Event 708, a request may be made and one or more inputs received that identify/define access privileges. The access privileges may include the security credentials (e.g., username/passcode, biometrics or the like) required to access the certified copy of the data file from the trust network. Further, the access privileges may include the content and/or content category from the data file that is authorized to be accessed and the time period during which the certified copy of the data file can be accessed or the number of accesses authorized to occur (i.e., number of times machine-readable code may be read).

At Event 710, the storage of the data file as a block(s) with the distributed ledger(s) of the distributed trust computing network is initiated, and, at Event 712, in response to storing the data file as a block(s) with the distributed ledger(s) of the distributed trust computing network, one or more storage locations (e.g., nodes/blocks/ledgers) within the trust network that store the data file are determined/received.

At Event 714, a machine-readable code (e.g., QR code or the like) is generated that identifies (acts as a pointer to) (i) the distributed trust computing network, (ii) the storage location of the data file within the distributed trust computing network, and, in some embodiments, (iii) the access privileges. The machine-readable code is configured to be captured and ready to provide access to at least a portion of the date file within the distributed computing network. At Event 716, the machine-readable code is embedded/populated within the original data file (such as, in the header or footer of a document file) and, at Event 718, the data file with the embedded machine-readable code is stored in local memory or distributed computing network (e.g., network or cloud) memory. As such, when the original document file is printed, an entity in possession and, in some embodiments, authorized may scan the machine-readable code to access the certified/verified copy of the data file stored within the distributed trust computing network.

Figure 6:
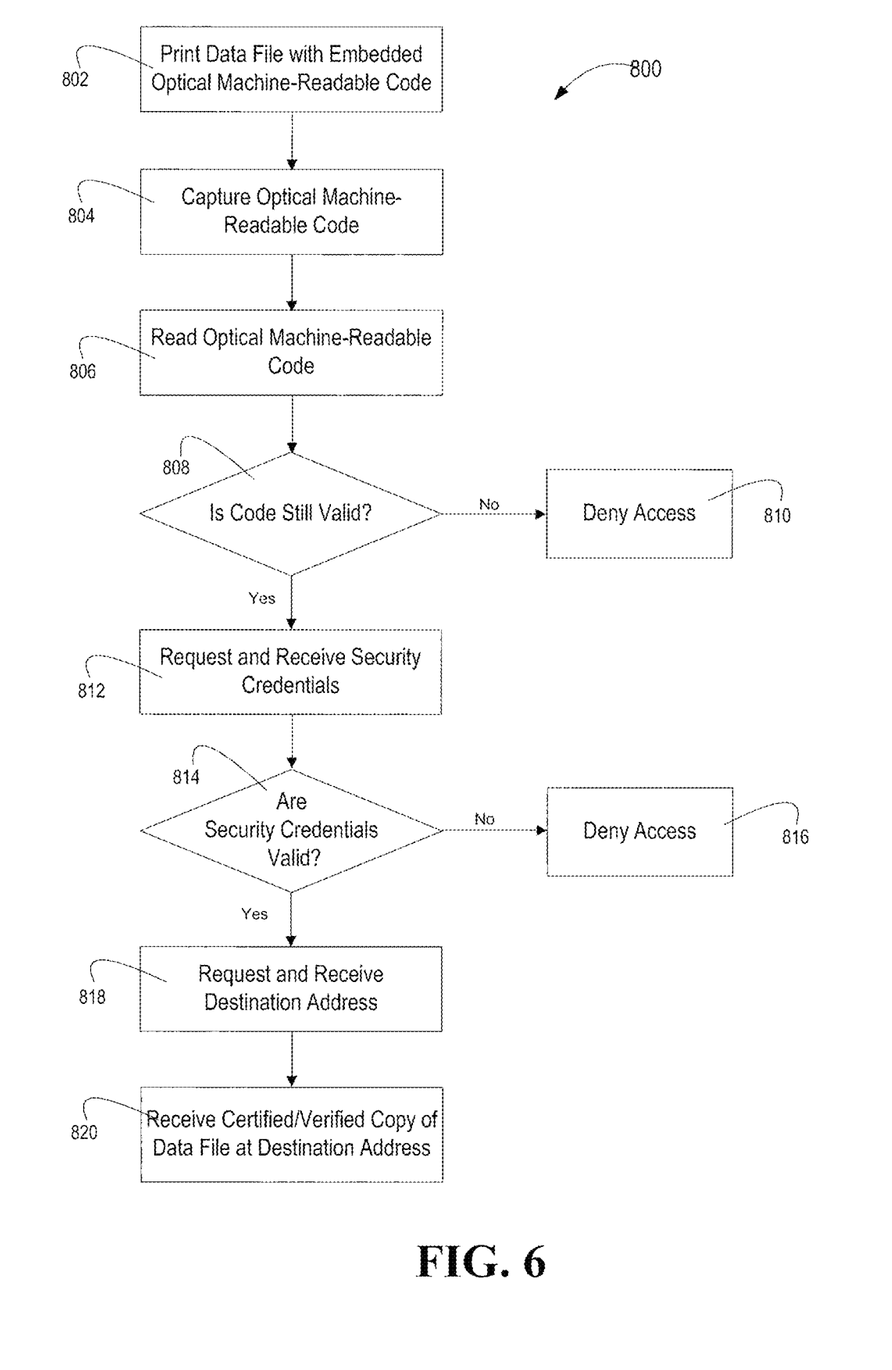
FIG. 6 is flow diagram of a method for accessing the data file stored in the distributed trust computing network through capturing and reading a machine-readable code that acts as a pointer to the trust network and storage location within the trust network, in accordance with embodiments of the present invention.

Referring to FIG. 6 a flow diagram is depicted of a method 800 for accessing a data file stored in a distributed trust computing network by capturing and reading a machine-readable code, in accordance with embodiments of the present invention. At optional Event 802, the data/document file with an embedded machine-readable code is printed. In other embodiments of the invention, the machine-readable code may be a stand-alone code or may be displayed, such as on the display of a mobile device or the like.

At Event 804, an image-capturing device (e.g., camera or the like) captured the machine-readable code and, at Event 806, an associated processing device reads the machine-readable code.

At optional Decision 808, a determination is made as to whether the code is valid in terms of a predefined time period for accessing the data file and/or exceeding the number of preconfigured accesses. In specific embodiments the code may be configured to be time dependent such that the certified/verified copy of the data file can only be accessed during the time period or prior to an expiration time/date. While in other specific embodiments the code may be configured to only allow a predetermined number of accesses to the certified/verified copy of the data file.

If the code is determined to be invalid, at Event 810, access is denied. If the code is determined to be valid, at optional Event 812, security credentials (e.g., username/passcode, biometrics or the like) are requested and received by the entity accessing the certified/verified copy of the data file. At optional Decision 814, a determination is made as to whether the security credentials are valid. If the security credentials are determined to be invalid, at Event 816 access is denied. If the security credentials are determined to be valid, at Event 818, a file destination address (e.g., email address, file directory location or the like) is requested and received. In response to receiving the file destination address and accessing the certified/verified copy of the data file in the trust network, at Event 820, at least a portion of the certified/verified copy of the data file is communicated to the file destination address.

Thus, present embodiments of the invention provide for storing data files within a distributed trust computing network, such as a blockchain network, which acts as a source of truth for the digital copy. In response to storing the data file within the distributed trust computing network, a machine-readable code is generated that, when read by an authorized entity, provides access to the certified digital copy stored within the distributed trust computing network. In this regard the machine-readable code serves as a pointer to the distributed trust computing network and the storage location within the trust network and, in specific embodiments the code is dynamic so as to provide access privileges (i.e., who is authorized to access, the content authorized to access, duration period for accessing and security credentials required to access).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing access to data stored in a distributed trust computing network, the system comprising:
   a distributed trust computing network comprising a plurality of decentralized nodes, each decentralized node having a first memory and at least one first processor in communication with the memory, wherein the first memory of the decentralized nodes is configured to store at least one distributed public ledger comprising a plurality of blocks of data, wherein the distributed trust computing network is configured to certify that the blocks of data are authentic and unaltered;
   a first computing platform disposed in a distributed computing network and including a second memory and at least one second processor in communication with the second memory, wherein the second memory stores first instructions that are executable by the second processor and configured to:
   receive at least one input that (i) requests storage of a data file within the distributed trust computing network, and (ii) identifies access privileges for one or more entities authorized to access the data file from the distributed trust computing network, initiate storage of the data file as a block of a distributed public ledger within the distributed trust computing network, in response to storing the data file within the block of the distributed public ledger, determine a storage location of the data file within the distributed trust computing network, and generate an optical machine-readable code that identifies (i) the distributed trust computing network, (ii) the storage location of the data file, defined as the block within the public ledger within the distributed trust computing network, and (iii) the access privileges, wherein the machine-readable code is configured to be captured and read to provide access to at least a portion of the data file stored within the distributed trust computing network based on the access privileges.

2. The system of claim 1, wherein the first instructions are further configured to embed the machine-readable code in the data file, wherein storage of the data file within the distributed computing network includes the embedded machine-readable code.

3. The system of claim 1, wherein the first instructions configured to receive the input that identifies the access privileges are further configured to receive the input that identifies at least one content type associated with content within the data file that the one or more entities are authorized to access.

4. The system of claim 1, wherein the first instructions configured to receive the input are further configured to receive the input that identifies security credentials required to be provided by the one or more entities authorized to access the data file.

5. The system of claim 1, wherein the first instructions configured to receive the input that identifies access privileges are further configured to receive the input that identifies one or more entity categories authorized to access the data file, wherein each entity category is pre-configured to be associated with at least one of (i) content type associated with content within the data file that the entities within the entity category are authorized to access, and (ii) security credentials required to be provided by the entities within the entity category to access the data file.

6. The system of claim 1, wherein the first instructions configured to initiate storage of the data file within the within the distributed trust computing network further comprise instructions configured to initiate storage of the data file in at least one of an original format and a converted non-editable format.

7. The system of claim 1, further comprising:
a second computing platform disposed in the distributed computing network and including a third memory, at least one third processor in communication with the third memory and image-capturing device in communication with the at least one third processor, wherein the third memory stores second instructions that are executable by the third processor and configured to:
implement the image-capturing device to capture the machine-readable code,
read the machine-readable code, and
in response to reading the machine-readable code, provide access to at least a portion of the data file stored within the distributed trust computing network.

8. The system of claim 7, wherein the second instructions are further configured to:
in response to reading the machine-readable code, request and receive an input that includes security credentials that authorize an entity to access the at least a portion of the data file,
verify the security credentials, and
in response to verifying the security credentials, provide access to at least a portion of the data file stored within the distributed trust computing network.

9. The system of claim 7, wherein the second instructions are further configured to:
in response to reading the machine-readable code, request and receive an input that defines a file destination address for the at least a portion of the data file, and
provide access to at least a portion of the data file stored within the distributed trust computing network by communicating the at least a portion of the data file to the file destination address.

10. A computer-implemented method for providing access to data stored on a distributed trust computing network, the computer-implemented method is implemented by one or more processing devices and comprising:
receiving at least one input that (i) requests storage of a data file within the distributed trust computing network, and (ii) identifies access privileges for one or more entities authorized to access the data file from the distributed trust computing network;
initiating storage of the data file as a block of a distributed public ledger within the distributed trust computing network;
in response to storing the data file within the block of the distributed public ledger, determining a storage location of the data file within the distributed trust computing network; and
generating an optical machine-readable code that identifies (i) the distributed trust computing network, (ii) the storage location of the data file, defined as the block within the public ledger within the distributed trust computing network, and (iii) the access privileges,
wherein the machine-readable code is configured to be captured and read to provide access to at least a portion of the data file stored within distributed trust computing network based on the access privileges.

11. The computer-implemented method of claim 10, further comprising:
embedding the machine-readable code in the data file; and
storing, within computing device memory, the data file including the embedded machine-readable code.

12. The computer-implemented method of claim 10, wherein receiving the input that identifies the access privileges further defines the access privileges as at least one of (i) at least one content type associated with content within the data file that the one or more entities are authorized to access, and (ii) security credentials required to be provided by the one or more entities authorized to access the data file.

13. A computer program product including a non-transitory computer-readable medium, the computer-readable medium comprising:
a first set of codes for causing a computer to receive at least one input that (i) requests storage of a data file within the distributed trust computing network, and (ii) identifies access privileges for one or more entities authorized to access the data file from the distributed trust computing network;

a second set of codes for causing a computer to initiate storage of the data file as a block of a distributed public ledger within the distributed trust computing network;

a third set of codes for causing a computer to, in response to storing the data file within the block of the distributed public ledger, determine a storage location of the data file within the distributed trust computing network; and a fourth set of codes for causing a computer to generate an optical machine-readable code that identifies (i) the distributed trust computing network, (ii) the storage location of the data file, defined as a block within a specified public ledger within the distributed trust computing network, and (iii) the access privileges, wherein the machine-readable code is configured to be captured and read to provide access to at least a portion of the data file stored within distributed trust computing network based on the access privileges.

\* \* \* \* \*